June 8, 1926.

R. MAXWELL

SAND BELT SPLICER

Filed Nov. 24, 1924

1,588,255

Witness:
R. E. Hamilton

Inventor,
Robert Maxwell,
By Thorpe & Gerard attys

Patented June 8, 1926.

1,588,255

UNITED STATES PATENT OFFICE.

ROBERT MAXWELL, OF INDEPENDENCE, KANSAS.

SAND-BELT SPLICE.

Application filed November 24, 1924. Serial No. 751,870.

This invention relates to sand belts and more especially to a splice for the ends of the belt, the object being to provide a splicing construction which will withstand rupture as well as any other part of the belt, and which can present no material projection to the "work"—the surface being ground—tending to groove it or to work appreciable injury to the belt, a further object being to provide a splice, which will accommodate such bending as is incidental to the use of the belt on a straight pulley, or longitudinal creasing such as incidental to the play of the belt longitudinally on beads or in grooves of molding.

With these general objects in view, the invention consists in providing the belt with saw tooth ends, and the edges of the saw teeth with small substantially V-shaped serrations, the teeth and projections of each end matching and fitting in the notches and serrations of the other end, and in securing such ends together by reinforcing strips glued or cemented to the inner surface of the belt, and in order that the invention may be fully understood, reference is to be had to the accompanying drawing, in which:—

In the said drawing, 1 indicates the ends of a strip of sand paper, emery paper or equivalent flexible abrading material for smoothing wood work or the like, said ends being of saw tooth form as at 2, with the edges of the teeth serrated, one end being the complement of the other so that the teeth of each and the projecting portions of the serrated edges shall fit into the notches of the other and provide a smooth joint of such character that the ends when secured in such matched relation shall present in transverse or longitudinal alinement, no plurality of extended broken lines to affect the strength of the jointure; this being better appreciated by assuming that the belt is sharply bent across the points of the teeth or sharply bent longitudinally at any point within the width of the belt. Under the first assumption it will be seen that the bend will intersect only two (or more) extremely small points where the ends come together, and in the second case only a single small point where such joinder occurs, and in neither case will the belt be subjected to appreciable rupturing strain.

Figure 1:
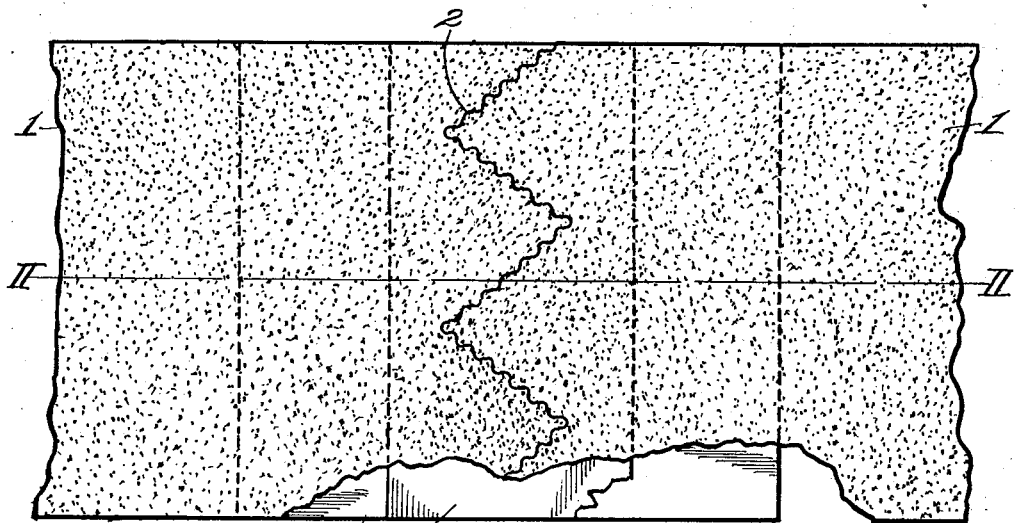
Figure 1 is a fragmentary plan view of a sand belt embodying the invention, with parts broken away to disclose certain belt-end securing elements.
Figure 2:
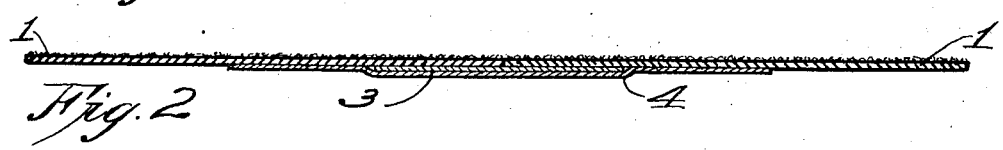
Figure 2 is a section on the line II—II of Figure 1.
Figure 3:
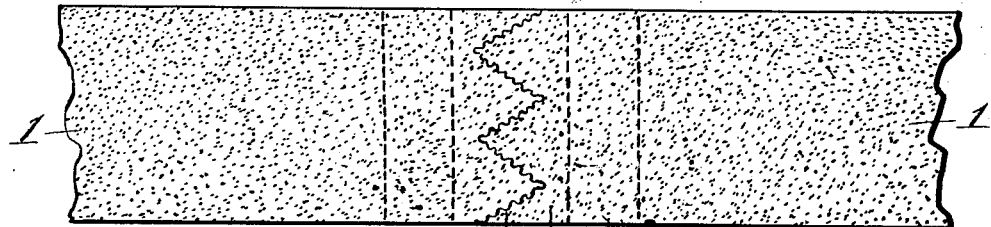
Figure 3 is a view corresponding to Figure 1 but of a narrower belt.
Figure 4:
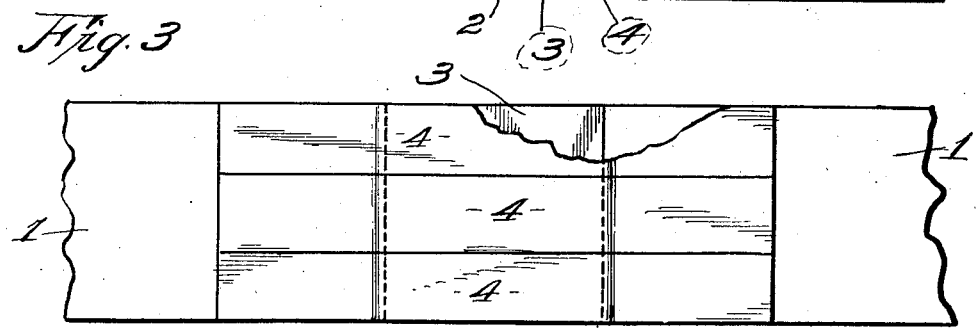
Figure 4 is an inverted plan view showing a slightly modified type of reforcing members.

To secure the ends of the belt in the relation described, a cross strip 3 is glued, cemented or otherwise suitably secured to the ends so as to cover the entire joint at the inner side thereof, and to still further strengthen the connection, a second strip 4 may be likewise secured to the strip 3 and to the belt-ends at opposite sides of said strip 3. In some cases (Figure 4) the last named strip 4 may be in multiple.

A belt spliced as explained, will stand the wear and tear of service as effectively as the body of the belt, in fact until the abrading surface is completely worn away, and will be found to successfully withstand all bending and twisting strains to which it is subjected in service, and this is true because the joint at no bending point is weakened by an extended line of jointure between the two ends, this being due to the fact that the joinder line is not only saw tooth in shape, but is serrated along said line, as should the belt be sharply bent coincidentally with one of the tooth sides, the bending action would be resisted by the serration projections of both ends of the belt.

It will be obvious that a belt splice of the character described will be found serviceable with leather and other belt fabrics as well as with belts for abrading or smoothing purposes, such as sand belts.

From the above description, it will be apparent that I have produced a device of the character described which possesses the features of advantage set forth as desirable, and while I have described and claimed the preferred embodiment of the same, I reserve the right to make all changes properly falling within the spirit and scope of the appended claim.

I claim:

A belt having spliced ends, each end at the splice joint being of sawtooth form from one side margin to the other, the sawtooth ends being complementary to each other and disposed in endwise abutment; the abutting ends having rounded serrations with the projecting portions of one end fitting in and interlocked with and abutting against the cavities or recesses of the other end, and one or more strips of flexible material secured to the inner side of the spliced end of the belt as a reinforcement for such splice.

In witness whereof I hereunto affix my signature.

ROBERT MAXWELL.